US012384643B2

(12) United States Patent
Naito et al.

(10) Patent No.: US 12,384,643 B2
(45) Date of Patent: Aug. 12, 2025

(54) PAPER TRANSPORT DEVICE

(71) Applicant: FUJIFILM Business Innovation Corp., Tokyo (JP)

(72) Inventors: Yasutaka Naito, Kanagawa (JP); Koichi Imazu, Kanagawa (JP); Noriyuki Miyoshi, Kanagawa (JP); Kouichi Kimura, Kanagawa (JP); Makoto Hasegawa, Kanagawa (JP); Satoshi Nakamura, Kanagawa (JP); Masakatsu Eda, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 173 days.

(21) Appl. No.: 17/749,117

(22) Filed: May 19, 2022

(65) Prior Publication Data

US 2023/0174331 A1 Jun. 8, 2023

(30) Foreign Application Priority Data

Dec. 3, 2021 (JP) ................................ 2021-197046

(51) Int. Cl.

| | |
|---|---|
| ***B65H 29/12*** | (2006.01) |
| ***B65H 5/22*** | (2006.01) |
| ***B65H 5/26*** | (2006.01) |
| ***B65H 7/20*** | (2006.01) |
| ***B65H 29/24*** | (2006.01) |
| ***G03G 15/00*** | (2006.01) |

(52) U.S. Cl.

CPC ........... *B65H 29/125* (2013.01); *B65H 5/224* (2013.01); *B65H 5/26* (2013.01); *B65H 7/20* (2013.01); *B65H 29/242* (2013.01); *G03G 15/657* (2013.01); *B65H 2301/4455* (2013.01); *B65H 2406/32* (2013.01); *B65H 2406/362* (2013.01); *B65H 2511/12* (2013.01); *B65H 2801/06* (2013.01)

(58) Field of Classification Search

CPC .... B65H 5/224; B65H 29/125; B65H 29/242; B65H 29/70; B65H 2301/5121; B65H 2406/32; B65H 2406/322; B65H 2406/3222; B65H 2406/362; B65H 2406/363; B65H 2406/3632; B65H 2511/12; B65H 2511/528; B65H 2601/255; G03G 15/657

See application file for complete search history.

(56) References Cited

U.S. PATENT DOCUMENTS

| | | | | |
|---|---|---|---|---|
| 9,815,303 B1 * | 11/2017 | Herrmann | ............ | B41J 11/0085 |
| 2010/0025918 A1 * | 2/2010 | Miyazawa | ........... | G03G 15/657 271/98 |
| 2010/0061741 A1 * | 3/2010 | Minbu | ................. | G03G 15/657 399/21 |

(Continued)

FOREIGN PATENT DOCUMENTS

JP 2001316011 11/2001

*Primary Examiner* — Prasad V Gokhale
(74) *Attorney, Agent, or Firm* — JCIPRNET

(57) ABSTRACT

A paper transport device includes a transport mechanism that transports paper to which an image is transferred to a fixing device while sucking the paper and a switching mechanism that switches between suction regions in a width direction of the transport mechanism, which corresponds to a width direction of the paper, according to a size of the paper.

11 Claims, 7 Drawing Sheets

(56) References Cited

U.S. PATENT DOCUMENTS

| | | | | |
|---|---|---|---|---|
| 2010/0276879 A1* | 11/2010 | Bober | B65H 5/224 | 271/276 |
| 2010/0314828 A1* | 12/2010 | Hoover | B65H 5/224 | 271/264 |
| 2013/0164065 A1* | 6/2013 | Kosuga | G03G 15/657 | 399/400 |
| 2015/0259144 A1* | 9/2015 | Hershfeld | B41F 17/24 | 198/689.1 |

* cited by examiner

| DISTANCE L | BENDING REGION | SUCTION FORCE INCREASE | SUCTION AREA | RUNNABILITY | |
|---|---|---|---|---|---|
| | | | | LONG PAPER | SHORT PAPER |
| 4 mm OR LESS | × (INSUFFICIENT) | NOT NECESSARY (DEFAULT) | DEFAULT | × | ○ |
| 4 TO 8 mm | △ | NECESSARY (20 TO 50%) | 70 TO 90% | △ | ○ |
| 8 TO 14 mm | ○ | NECESSARY (50 TO 90%) | 50 TO 70% | ○ | ○ |
| 14 mm OR MORE | ○ | – (TRANSPORT IMPOSSIBLE) | – (TRANSPORT IMPOSSIBLE) | ○ | × |

PAPER TRANSPORT DEVICE

CROSS-REFERENCE TO RELATED APPLICATIONS

This application is based on and claims priority under 35 USC 119 from Japanese Patent Application No. 2021-197046 filed Dec. 3, 2021.

BACKGROUND

(i) Technical Field

The present invention relates to a paper transport device.

(ii) Related Art

A device that transports paper in an image forming apparatus is known.

JP2001-316011A describes a mechanism that changes a region where a sticking force acts on the paper transported by a paper transport belt to have a width substantially the same as a paper width in a direction orthogonal to a transport direction of the paper.

SUMMARY

However, in a device that transports paper to which an image is transferred to a fixing device while sucking the paper, in a case where a suction region in a width direction of the paper is constant regardless of the size of the paper, a paper jam or a positional shift occurs during transport or a paper wrinkle occurs according to the size of the paper in some cases.

Aspects of non-limiting embodiments of the present disclosure relate to a paper transport device that suppresses the occurrence of a transport failure in a case where paper to which an image is transferred is transported to a fixing device while being sucked, compared to a case where a suction region is kept constant in a width direction of the paper regardless of the size of the paper.

Aspects of certain non-limiting embodiments of the present disclosure overcome the above disadvantages and/or other disadvantages not described above. However, aspects of the non-limiting embodiments are not required to overcome the disadvantages described above, and aspects of the non-limiting embodiments of the present disclosure may not overcome any of the disadvantages described above.

According to an aspect of the present disclosure, there is provided a paper transport device including a transport mechanism that transports paper to which an image is transferred to a fixing device while sucking the paper and a switching mechanism that switches between suction regions in a width direction of the transport mechanism, which corresponds to a width direction of the paper, according to a size of the paper.

BRIEF DESCRIPTION OF THE DRAWINGS

Exemplary embodiment(s) of the present invention will be described in detail based on the following figures, wherein.

DETAILED DESCRIPTION

Figure 1:
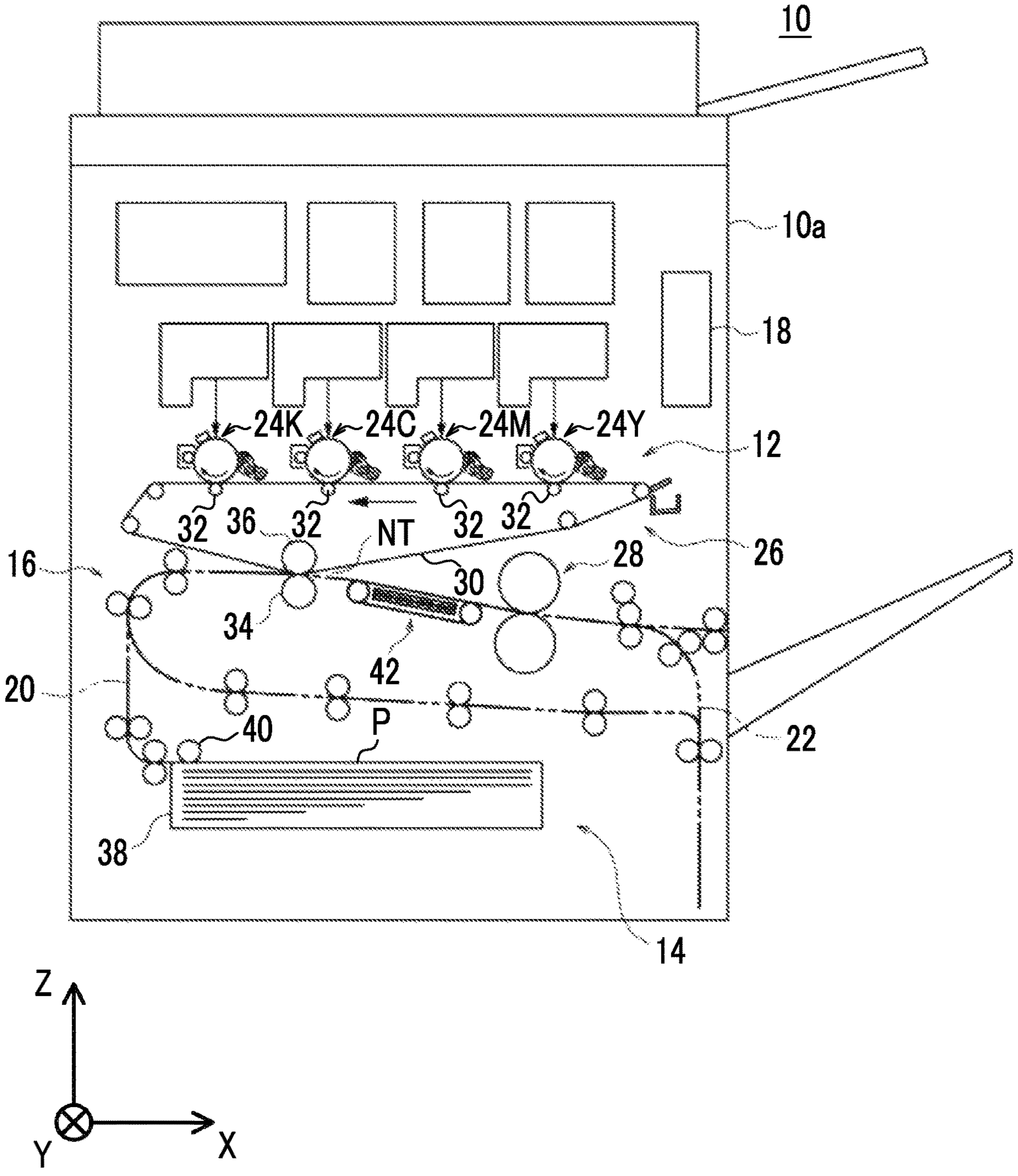
FIG. 1 is a view showing an image forming apparatus according to an exemplary embodiment.

An image forming apparatus according to an exemplary embodiment will be described with reference to FIG. 1. For convenience of description, an X-direction, a Y-direction, and a Z-direction, which are orthogonal to each other, are defined. The X-direction and the Y-direction are horizontal directions, and the Z-direction is a vertical direction. For example, the X-direction corresponds to a width direction of an image forming apparatus 10, the Y-direction corresponds to a depth direction of the image forming apparatus 10, and the Z-direction corresponds to a height direction of the image forming apparatus 10. The name of each of the width direction, the depth direction, and the height direction of the image forming apparatus 10 is given for convenience of description, and does not limit the significance of each direction of the image forming apparatus 10.

The image forming apparatus 10 includes an image forming unit 12, an accommodating unit 14, a transport unit 16, and a control device 18.

The image forming unit 12 forms a toner image, for example, through an electrophotographic method. The accommodating unit 14 accommodates paper P which is an example of a recording medium. The transport unit 16 transports the paper P accommodated in the accommodating unit 14 toward the image forming unit 12 along a transport path 20. In addition, the transport unit 16 transports the paper P transported along the transport path 20 along an inversion path 22 to invert the front and back of the paper P and again transports the paper toward the image forming unit 12.

The toner image formed by the image forming unit 12 is formed on the front surface of the paper P transported along the transport path 20. The paper P on which the toner image is formed is discharged to the outside of a housing **10*a* of the image forming apparatus 10**.

In a case of forming a toner image on the back surface of the paper P, the paper P having the front surface on which the toner image is formed is transported along the inversion path 22, and the toner image is again formed on the back surface of the paper P by the image forming unit 12. After then, the paper P is discharged to the outside of the housing **10*a*. In the example shown in FIG. 1, the image forming apparatus 10** has a function of forming toner images on both surfaces of the paper P, but may have a function of forming a toner image only on one surface of the paper P.

The image forming unit 12 includes, for example, image forming units 24Y, 24M, 24C, and 24K, a transfer unit 26, and a fixing device 28 and forms a toner image for each color. The image forming unit 24Y forms a yellow (Y) toner image using a yellow (Y) toner. The image forming unit 24M forms a magenta (M) toner image using a magenta (M) toner. The image forming unit 24C forms a cyan (C) toner image using a cyan (C) toner. The image forming unit 24K forms a black (K) toner image using a black (K) toner. The transfer unit 26 transfers the toner image formed by each of the image forming units 24Y, 24M, 24C, and 24K to the paper P. The fixing device 28 fixes the toner image transferred to the paper P by the transfer unit 26 to the paper P. Although four colors of toners are used in the example shown in FIG. 1, this is merely an example, and five or more colors of toners may be used. For example, in addition to yellow, magenta, cyan, and black, other colors may be used. As another example, only a black toner may be used.

The image forming units 24Y, 24M, 24C, and 24K have basically the same configuration except for a toner to be used. For example, each of the image forming units 24Y, 24M, 24C, and 24K includes a rotating cylindrical image holding body, a charger that charges the image holding body, an exposure device, and a developing device. The exposure device irradiates the charged image holding body with light and forms an electrostatic latent image. The developing device develops the electrostatic latent image with a developer containing a toner as a toner image.

The transfer unit 26 includes a transfer belt 30, a primary transfer roller 32, a secondary transfer roller 34, and a roller 36. The transfer belt 30 is wound around a plurality of rollers including the roller 36 and moves around in a direction of an arrow in FIG. 1. A secondary transfer portion NT (that is, a nip portion) where a toner image is transferred to the paper P is formed between the secondary transfer roller 34 and the transfer belt 30.

The fixing device 28 is arranged on a downstream side of the secondary transfer portion NT in a transport direction of the paper P.

The accommodating unit 14 includes an accommodating member 38 and a feeding roller 40. The accommodating member 38 accommodates the paper P. The feeding roller 40 feeds the paper P accommodated in the accommodating member 38 to the transport path 20.

The transport unit 16 includes a plurality of transport rollers and a paper transport device 42. The paper P fed from the accommodating unit 14 is transported along the transport path 20 by the plurality of transport rollers. The paper transport device 42 transports the paper P to which the toner image is transferred while sucking the paper and delivers the paper to the fixing device 28.

The control device 18 controls each unit of the image forming apparatus 10.

The image forming apparatus 10 forms an image on the paper P as described below.

First, in each of the image forming units 24Y, 24M, 24C, and 24K, an electrostatic latent image is formed as the surface of the image holding body is charged by the charger and the surface of the image holding body is exposed by the exposure device, and the electrostatic latent image is developed by the developing device. Accordingly, a toner image is formed on the surface of the image holding body. A toner image having each color is transferred to the transfer belt 30 by the primary transfer roller 32 in turn.

The paper P is fed from the accommodating member 38 to the transport path 20 by the feeding roller 40 and is fed to the secondary transfer portion NT along the transport path 20. As the paper P is transported between the transfer belt 30 and the secondary transfer roller 34, the toner image transferred to the transfer belt 30 is transferred to the front surface of the paper P at the secondary transfer portion NT.

The paper P to which the toner image is transferred is transported to the fixing device 28 by the paper transport device 42. The toner image transferred to the front surface of the paper P is fixed to the paper P by the fixing device 28. The paper P to which the toner image is fixed is discharged to the outside of the housing 10*a*.

In a case of forming a toner image also on the back surface of the paper P, the transport unit 16 inverts the front and back of the paper P by transporting the paper P, which has passed through the fixing device 28, along the inversion path 22 and transports the paper P of which the front and back are inverted to the secondary transfer portion NT along the transport path 20. The toner image is transferred to the back surface of the paper P at the secondary transfer portion NT and the toner image is fixed to the paper P by the fixing device 28. The paper P to which the toner image is fixed is discharged to the outside from the housing 10*a*.

Figure 2:
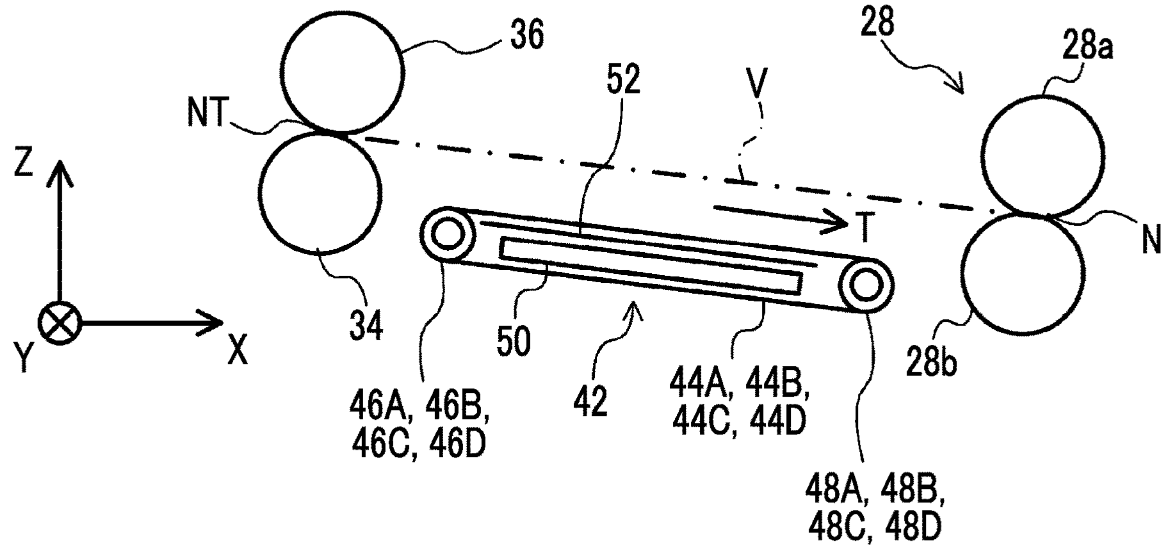
FIG. 2 is a view showing a secondary transfer portion, a fixing device, and a paper transport device.
Figure 3:
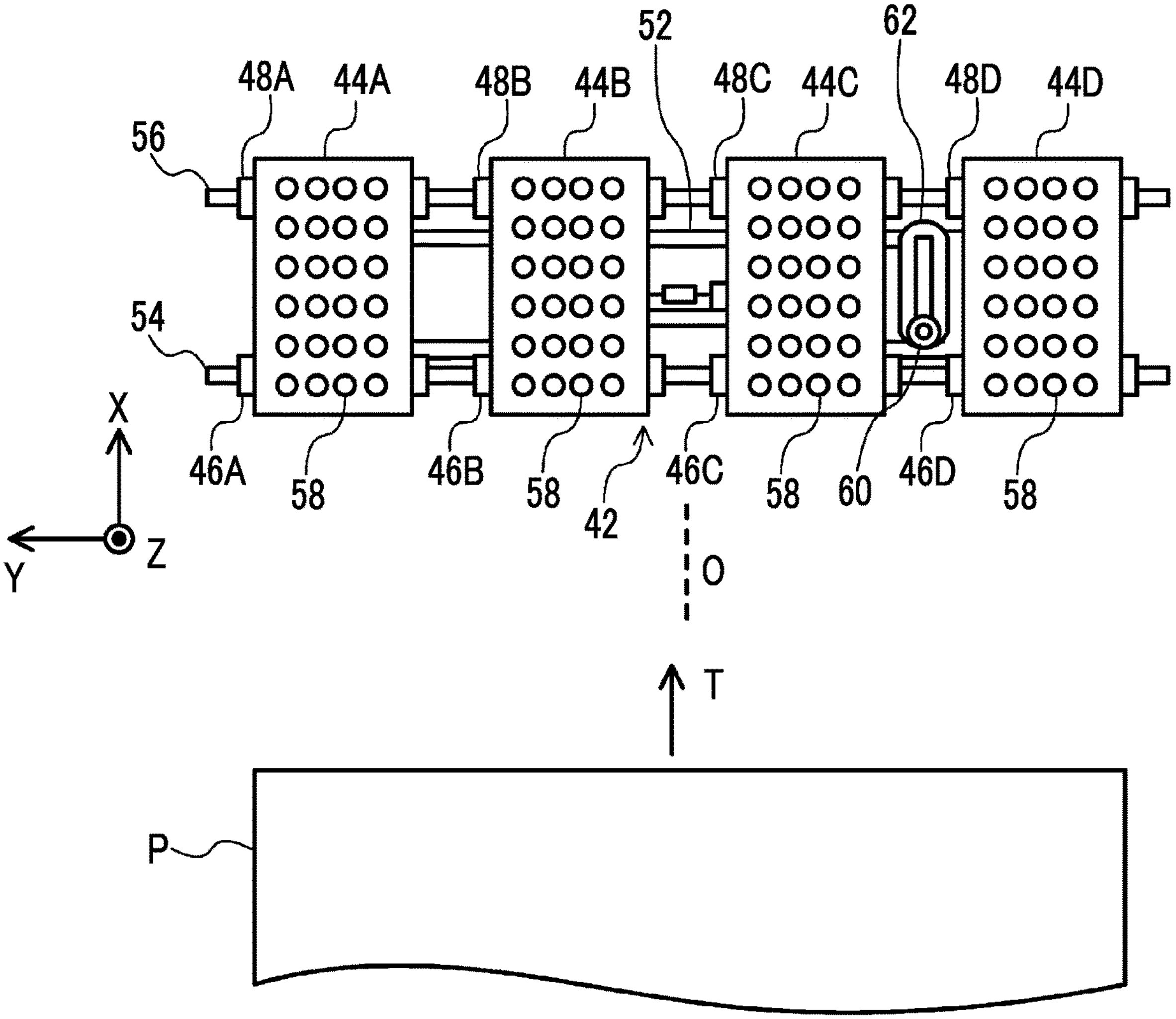
FIG. 3 is a view showing the paper transport device.

Hereinafter, the paper transport device 42 will be described with reference to FIGS. 2 and 3. FIG. 2 shows the secondary transfer portion NT, the fixing device 28, and the paper transport device 42. FIG. 3 shows a configuration in a case where the paper transport device 42 is viewed from the Z-direction.

As shown in FIG. 2, the paper transport device 42 is arranged on the downstream side of the secondary transfer portion NT and an upstream side of the fixing device 28 in the transport direction of the paper.

The fixing device 28 includes a fixing roller 28*a* and a pressurizing roller 28*b*. The fixing roller 28*a* and the pressurizing roller 28*b* are cylindrical rollers, are attached to rotating shafts having the Y-direction as an axial direction, and are rotatable. The fixing roller 28*a* is rotated by a motor (not shown). In addition, a heater such as a halogen lamp is built in the fixing roller 28*a* and heats the paper P. The pressurizing roller 28*b* is arranged at a position facing the fixing roller 28*a* with the transport path of the paper P placed therebetween. The pressurizing roller 28*b* is pressed against the fixing roller 28*a* by an elastic member such as a spring. Accordingly, the pressurizing roller 28*b* pressurizes the paper P toward the fixing roller 28*a*. A fixing portion N (that is, a nip portion) where a toner image is fixed to the paper P is formed between the fixing roller 28*a* and the pressurizing roller 28*b*. The paper P transported to the fixing portion N is heated by the fixing roller 28*a* and is pressurized toward the fixing roller 28*a* by the pressurizing roller 28*b*. Accordingly, the toner image is fixed to the paper P. A fixing belt wound around the fixing roller 28*a* may be used, the fixing portion N may be formed between the fixing belt and the pressurizing roller 28*b*, and the toner image may be fixed to the paper P. In addition, the fixing portion N may be formed between the fixing belt wound around a fixed-type fixing pad member and the pressurizing roller, and the toner image may be fixed to the paper P.

In the example shown in FIG. 2, an imaginary line V is defined. The imaginary line V is a line connecting a position (that is, the secondary transfer portion NT) where a toner image is transferred to the paper P and a position (that is, the fixing portion N) where the toner image is fixed to the paper P by the fixing device 28 to each other.

The paper transport device 42 includes transport belts 44A, 44B, 44C, and 44D, support rollers 46A, 46B, 46C, and 46D, drive rollers 48A, 48B, 48C, and 48D, an intake unit 50, and a shutter 52.

The transport belts 44A, 44B, 44C, and 44D are belts for transporting the paper P. The transport belt 44A is wound around the support roller 46A and the drive roller 48A. The transport belt 44B is wound around the support roller 46B and the drive roller 48B. The transport belt 44C is wound around the support roller 46C and the drive roller 48C. The transport belt 44D is wound around the support roller 46D and the drive roller 48D.

The support rollers 46A, 46B, 46C, and 46D are cylindrical members having the Y-direction as an axial direction and are arranged on a secondary transfer portion NT side (that is, an upstream side) of the intake unit 50 with an interval in the Y-direction. In addition, the support rollers 46A, 46B, 46C, and 46D are attached to a rotating shaft 54 having the Y-direction as an axial direction. The rotating shaft 54 is supported by a bearing member (not shown) so as to be rotatable.

The drive rollers 48A, 48B, 48C, and 48D are cylindrical members having the Y-direction as an axial direction and are arranged on a fixing device 28 side (that is, the downstream side) of the intake unit 50 with an interval in the Y-direction. In addition, the drive rollers 48A, 48B, 48C, and 48D are attached to a rotating shaft 56 having the Y-direction as an axial direction. The rotating shaft 56 rotates as being supported by the bearing member (not shown) and being driven by the motor (not shown).

The support roller 46A and the drive roller 48A are arranged with the intake unit 50 placed therebetween in the transport direction of the paper P. The support roller 46B and the drive roller 48B are arranged with the intake unit 50 placed therebetween in the transport direction of the paper P. The support roller 46C and the drive roller 48C are arranged with the intake unit 50 placed therebetween in the transport direction of the paper P. The support roller 46D and the drive roller 48D are arranged with the intake unit 50 placed therebetween in the transport direction of the paper P.

The transport belts 44A, 44B, 44C, and 44D are, for example, endlessly formed belts (for example, belts made of silicone rubber). A plurality of holes 58 which have penetrated from an inner side to an outer side are formed in the transport belts 44A, 44B, 44C, and 44D.

The intake unit 50 takes in air on the inner side of the transport belts 44A, 44B, 44C, and 44D. For example, an intake fan is arranged inside the intake unit 50. As the intake fan operates, the intake unit 50 takes in air above the transport belts 44A, 44B, 44C, and 44D. Accordingly, the paper P sticks to the transport belts 44A, 44B, 44C, and 44D.

In a case where the drive rollers 48A, 48B, 48C, and 48D are rotated as the rotating shaft 56 is rotated by the motor, the transport belts 44A, 44B, 44C, and 44D move around such that the paper P is transported from the secondary transfer portion NT to the fixing device 28. In addition, as the intake unit 50 takes in air above the transport belts 44A, 44B, 44C, and 44D, the paper P is transported from the secondary transfer portion NT to the fixing device 28 while sticking to the transport belts 44A, 44B, 44C, and 44D. FIGS. 2 and 3 show a transport direction T of the paper P.

The transport belts 44A, 44B, 44C, and 44D and the intake unit 50 are examples of a transport mechanism.

The shutter 52 is arranged in a space between the support rollers 46A, 46B, 46C, and 46D and the drive rollers 48A, 48B, 48C, and 48D of a space between the transport belts 44A, 44B, 44C, and 44D and the intake unit 50. The shutter 52 is a member that is movable in a width direction of the transport mechanism and is a member that switches between suction regions in the width direction of the transport mechanism by moving in the width direction, which is the transport direction. The shutter is an example of a switching mechanism.

The width direction of the transport mechanism is a width direction of the transport belts 44A, 44B, 44C, and 44D. The width direction of the transport mechanism matches, for example, axial directions (that is, a direction in which the support roller and the drive roller extend) of the rotating shafts 54 and 56 and matches a direction orthogonal to a direction in which the transport belts 44A, 44B, 44C, and 44D move around. In the example shown in FIG. 3, the Y-direction is the width direction of the transport mechanism. The width direction of the transport mechanism corresponds to a width direction of the paper P. Herein, for example, the width direction of the paper P is defined as the width direction of the transport mechanism.

As shown in FIG. 3, the paper transport device 42 further includes a knob 60 and a guide member 62. The knob 60 is a member for operating the movement of the shutter 52 in the width direction of the transport mechanism. The knob 60 is a member that is movable between the rotating shaft 54 and the rotating shaft 56. The guide member 62 is a member that is arranged between the rotating shaft 54 and the rotating shaft 56 and that guides the movement of the knob 60. A groove is formed in the guide member 62 along a direction from the rotating shaft 54 toward the rotating shaft 56, and the knob 60 is moved along the groove. The knob 60 is operated by an operator such as a user.

For example, the knob 60 and the guide member 62 are provided between the transport belt 44C and the transport belt 44D. That is, the knob 60 and the guide member 62 are provided on a transport mechanism end portion side with respect to a center O of the transport mechanism in the width direction. A top portion of the knob 60 is provided at a position lower than surfaces of the transport belts 44A, 44B, 44C, and 44D through which the paper P passes (that is, surfaces to which the paper P sticks). Accordingly, the knob 60 does not interfere with the transport of the paper P.

The center O of the transport mechanism in the width direction corresponds to a center in the width direction in a case where the transport belts 44A, 44B, 44C, and 44D are arranged in this order and specifically, corresponds to a center between the transport belt 44B and the transport belt 44C.

Since the knob 60 is arranged on the end portion side with respect to the center O, it is easy to operate the knob 60 from the end portion side (for example, a transport belt 44D side) compared to a case where the knob 60 is arranged at the center O. For example, in a case where the transport belt 44D is arranged on a front side of the image forming apparatus 10, it is easy to operate the knob 60 from the front side compared to a case where the knob 60 is arranged at the center O. That is, as the knob 60 is arranged on the front side with respect to the center O, the knob 60 can be operated without extending a hand to a back side of the image forming apparatus 10 since a distance from the front side to the knob 60 is short compared to a case where the knob 60 is arranged at the center O.

Figure 4:
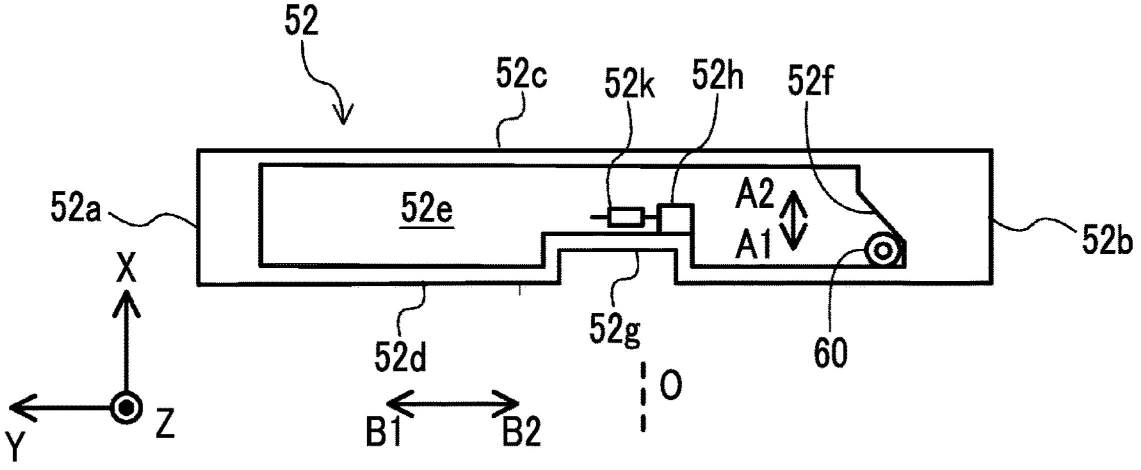
FIG. 4 is a view showing a shutter.
Figure 5:
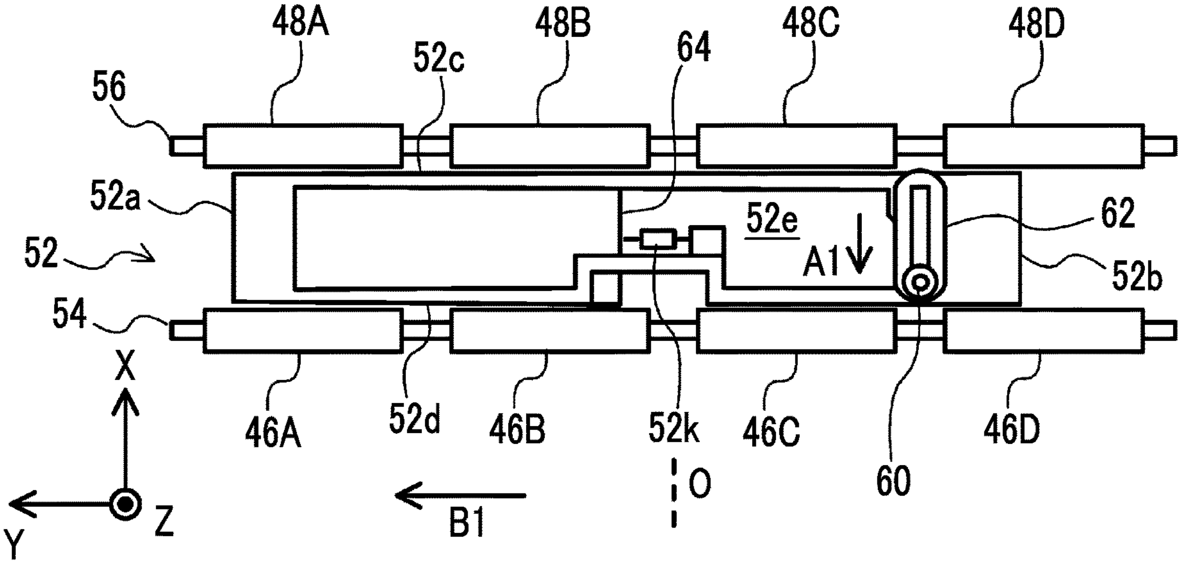
FIG. 5 is a view showing a configuration of the paper transport device and a configuration excluding a transport belt.

Hereinafter, the shutter 52 will be described in detail with reference to FIGS. 4 and 5. FIG. 4 shows the shutter 52. FIG. 5 shows a configuration of the paper transport device 42 and a configuration excluding the transport belts 44A, 44B, 44C, and 44D.

The shutter 52 has a rectangular frame shape as a whole. Specifically, the shutter 52 includes short side members 52*a* and 52*b* and long side members 52*c* and 52*d*.

The short side members 52*a* and 52*b* are members facing each other. The short side members 52*a* and 52*b* are arranged along the direction from the rotating shaft 54 toward the rotating shaft 56 in the space between the support rollers 46A, 46B, 46C, and 46D and the drive rollers 48A, 48B, 48C, and 48D. The short side member 52*a* is arranged on a position side where the support roller 46A and the drive roller 48A are arranged with respect to the center O of the transport mechanism in the width direction, and the short side member 52*b* is arranged on a position side where the support roller 46D and the drive roller 48D are arranged with respect to the center O of the transport mechanism in the width direction.

The long side members 52*c* and 52*d* are members facing each other. The long side members 52*c* and 52*d* are arranged along the rotating shafts 54 and 56 in the space between the support rollers 46A, 46B, 46C, and 46D and the drive rollers 48A, 48B, 48C, and 48D. The long side member 52*c* is arranged on a rotating shaft 56 side, and the long side member 52*d* is arranged on a rotating shaft 54 side.

The short side members 52*a* and 52*b* are connected to each other by the long side members 52*c* and 52*d*. That is, an end portion of the short side member 52*a* on the rotating shaft 56 side is connected to one end of the long side member 52*c*, and an end portion of the short side member 52*b* on the rotating shaft 56 side is connected to the other end of the long side member 52*c*. In addition, an end portion of the short side member 52*a* on the rotating shaft 54 side is connected to one end of the long side member 52*d*, and an end portion of the short side member 52*b* on the rotating shaft 54 side is connected to the other end of the long side member 52*d*.

The shutter 52 may be one member obtained by integrating the short side members 52*a* and 52*b* and the long side members 52*c* and 52*d* with each other, and the shutter 52 may be formed by making the short side members 52*a* and 52*b* and the long side members 52*c* and 52*d* members separate from each other and assembling the short side members 52*a* and 52*b* and the long side members 52*c* and 52*d*.

A space 52*e* is a space surrounded by the short side members 52*a* and 52*b* and the long side members 52*c* and 52*d*. The intake unit 50 takes in air above the transport belts 44A, 44B, 44C, and 44D via the space 52*e*.

The short side members 52*a* and 52*b* function as members blocking intake by the intake unit 50. That is, the intake unit 50 takes in air via the space 52*e*. However, at a place where the short side members 52*a* and 52*b* are arranged, the short side members 52*a* and 52*b* block intake by the intake unit 50, and the intake unit 50 does not take in air above the transport belts 44A, 44B, 44C, and 44D. Thus, the paper P sticks to the transport belts 44A, 44B, 44C, and 44D due to the intake unit 50 at a place corresponding to the space 52*e*, but does not stick to the transport belts at the place where the short side members 52*a* and 52*b* are arranged.

A side 52*f* of the short side member 52*b* in contact with the space 52*e* is formed obliquely with respect to the direction from the rotating shaft 54 toward the rotating shaft 56. For example, the side 52*f* is formed obliquely such that the width (that is, a length in a direction corresponding to the width direction of the transport mechanism) of the short side member 52*b* gradually increases from the rotating shaft 54 side to the rotating shaft 56 side. That is, from the long side member 52*d* to the long side member 52*c*, the side 52*f* is formed obliquely from a short side member 52*b* side to a short side member 52*a* side.

A portion of the side 52*f* on the rotating shaft 54 side and a portion of the side 52*f* on the rotating shaft 56 side are formed along the direction from the rotating shaft 54 toward the rotating shaft 56 such that the knob 60 is arranged. In the example shown in FIG. 4, the knob 60 is arranged at the portion of the side 52*f* on the rotating shaft 54 side.

A portion 52*g* of the long side member 52*d*, which corresponds to the center O of the transport mechanism in the width direction, protrudes to a space 52*e* side. On the space 52*e* side of the protruding portion 52*g*, a support member 52*h* is provided. One end of a spring 52*k* is attached to the support member 52*h*. The spring 52*k* is provided along the width direction of the transport mechanism. As shown in FIG. 5, the other end of the spring 52*k* is attached to a member 64. The member 64 is arranged on the short side member 52*a* side of the spring 52*k*. The spring 52*k* applies a force acting in the width direction of the transport mechanism to the shutter 52. The spring 52*k* is an example of the elastic member. Rubber may be used as an elastic member other than the spring 52*k*.

As described with reference to FIG. 3, the knob 60 is a member movable along the guide member 62 between the rotating shaft 54 and the rotating shaft 56. More specifically, the knob 60 is movable in an A1 direction or an A2 direction between the long side member 52*c* and the long side member 52*d* in the space 52*e*. The A1 direction is a direction toward the long side member 52*d*. The A2 direction is a direction toward the long side member 52*c*.

In response to the movement of the knob 60 in the A1 direction or the A2 direction, the shutter 52 is moved in the width direction of the transport mechanism.

Specifically, in a case where the knob 60 is moved in the A1 direction, the shutter 52 is moved to a transport belt 44A side in the width direction of the transport mechanism. In the example shown in FIG. 4, the shutter 52 is moved in a B1 direction. The spring 52*k* extends with the movement of the shutter 52, and accordingly, an elastic force in a direction toward the transport belt 44D (a B2 direction in FIG. 4) is generated.

In addition, in a case where the knob 60 is moved in the A2 direction, the shutter 52 is moved to the transport belt 44D side in the width direction of the transport mechanism. In the example shown in FIG. 4, the shutter 52 is moved in the B2 direction. The spring 52*k* contracts with the movement of the shutter 52, and accordingly, an elastic force in a direction toward the transport belt 44A (the B1 direction in FIG. 4) is generated.

Figure 6:
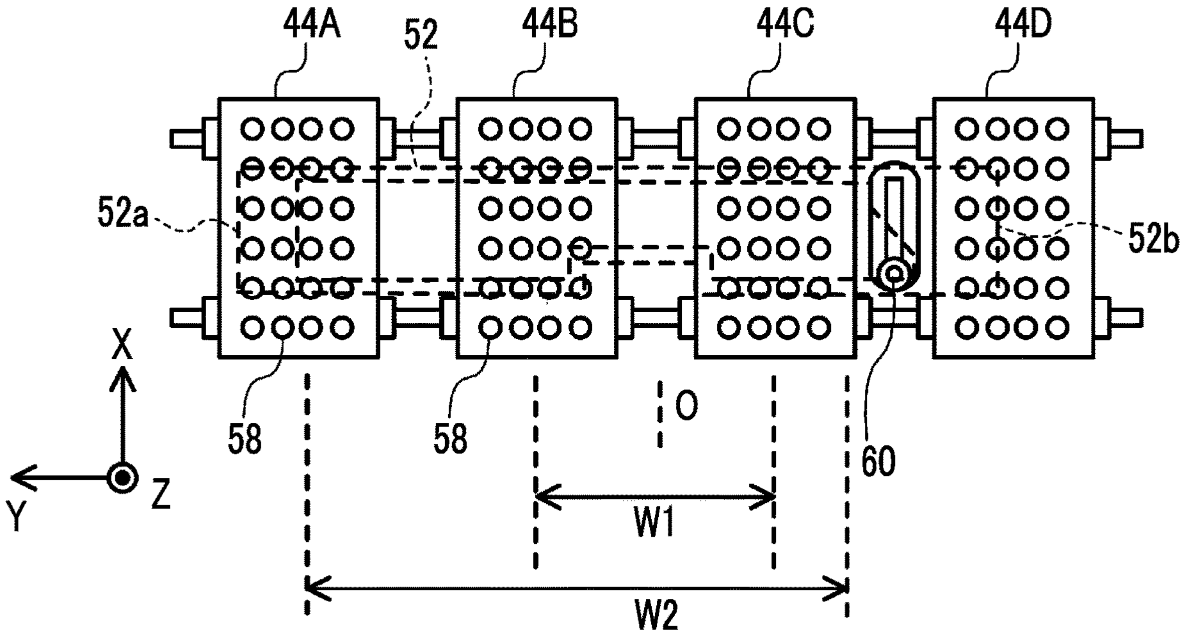
FIG. 6 is a view showing the paper transport device.
Figure 7:
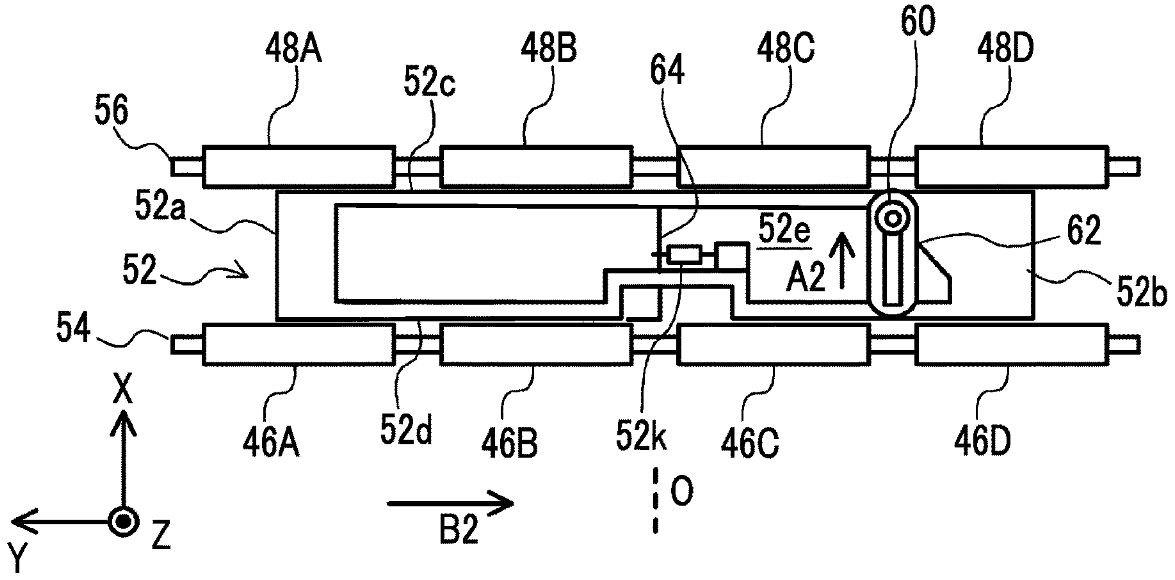
FIG. 7 is a view showing a configuration of the paper transport device and a configuration excluding the transport belt.
Figure 8:
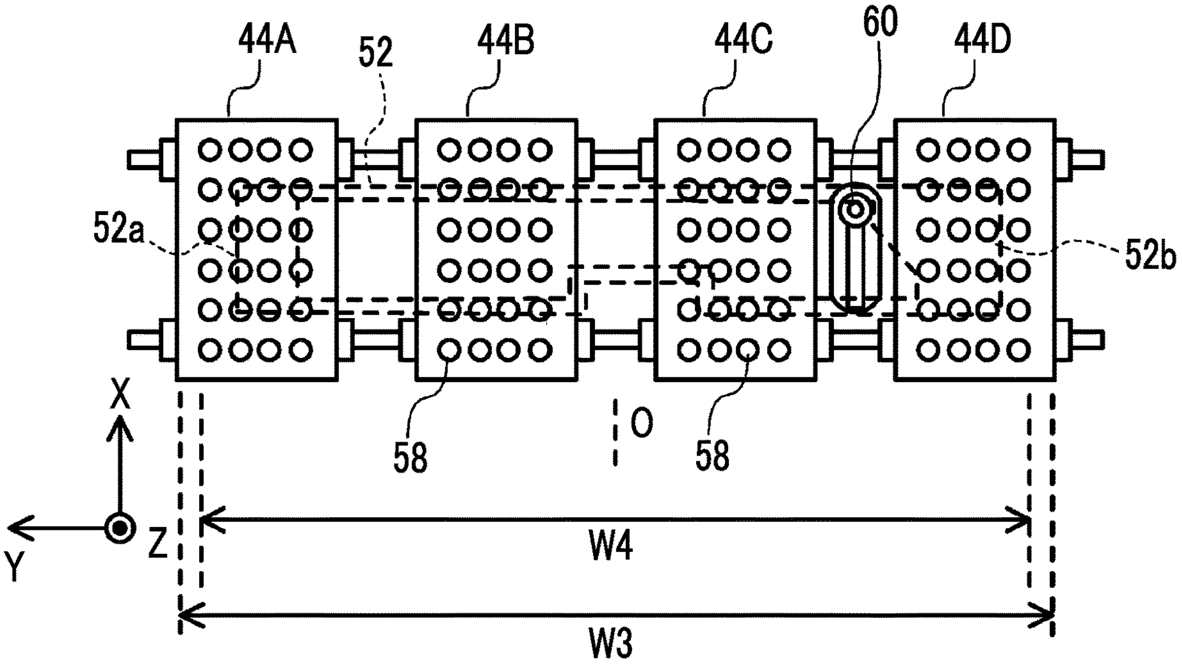
FIG. 8 is a view showing the paper transport device.

Hereinafter, an operation of the shutter 52 will be described with reference to FIGS. 5 to 8. FIGS. 6 and 8 are views showing the paper transport device 42. FIG. 7 shows a configuration of the paper transport device 42 and a configuration excluding the transport belts 44A, 44B, 44C, and 44D. In FIGS. 6 and 8, the shutter 52 is shown by a broken line.

In a case where the knob 60 is moved in the A1 direction, the shutter 52 is moved to the transport belt 44A side, that is, in the B1 direction as shown in FIGS. 5 and 6. Accordingly, at least the center O and a periphery thereof are defined as a region where intake is performed by the intake unit 50. The suction region in a case where the shutter 52 is moved in the B1 direction is an example of a second suction region. As shown in FIG. 6, a region having a width W2 in the width direction of the transport mechanism is the second suction region. In a region on the outer side of the second suction region in the width direction, intake from the holes 58 is blocked by the short side members 52*a* and 52*b*. For example, intake from the holes 58 formed in the transport belt 44A is blocked by the short side member 52*a*, and intake from the holes 58 formed in the transport belt 44D is blocked by the short side member 52*b*. As a result of blocking the intake in the region on the outer side of the second suction region as described above, a suction force in the second suction region increases.

In a case where the knob 60 is moved in the A2 direction, the shutter 52 is moved to the transport belt 44D side, that is, in the B2 direction as shown in FIGS. 7 and 8. Accordingly, the center O, the periphery thereof, a region of the transport belt 44A on the end portion side in the width direction and a region of the transport belt 44D on the end portion side in the width direction are defined as a region where intake is performed by the intake unit 50. That is, via not only the holes 58 formed in the center O and the periphery thereof but also the holes 58 formed on the outermost side of the transport belt 44A in the width direction and the holes 58 formed on the outermost side of the transport belt 44D in the width direction, air is taken in by the intake unit 50. The suction region in a case where the shutter 52 is moved in the B2 direction is an example of a first suction region. As shown in FIG. 8, a region having a width W4 in the width direction of the transport mechanism is the first suction region. That is, the first suction region is formed from the positions of the holes 58 formed on the outermost side of the transport belt 44A in the width direction to the positions of the holes 58 formed on the outermost side of the transport belt 44D in the width direction.

As described above, the shutter 52 has a function of switching regions where air is taken in by the intake unit 50 in the width direction of the transport mechanism. That is, the shutter 52 has a function of switching the regions where the paper P is sucked in the width direction of the transport mechanism.

For example, as the knob 60 is moved in the A1 direction or the A2 direction according to the size of the paper P, the first suction region and the second suction region are switched. The knob 60 functions as an operation unit for operating the shutter 52 and switching the suction regions.

For example, in a case where the paper P having a width W1 in the width direction of the transport mechanism is used as shown in FIG. 6, the knob 60 is moved in the A1 direction as shown in FIG. 5. Accordingly, as shown in FIGS. 5 and 6, the shutter 52 is moved in the B1 direction, and as a result, the center O and the periphery thereof are defined as a region where air is taken in by the intake unit 50 (that is, the second suction region having the width W2).

The paper P having the width W1 passes through a region of the paper transport device 42 including the center O. For example, the paper P is transported by the transport belts 44B and 44C while being sucked via some of the plurality of holes 58 formed in the transport belts 44B and 44C.

As described above, a suction force in the second suction region increases since intake from the holes 58 is blocked by the short side members 52*a* and 52*b* in the region on the outer side of the second suction region in the width direction. Accordingly, the suction force with respect to the paper P increases, and a transport failure such as a paper jam attributable to a decrease in the suction force is prevented.

In addition, as shown in FIG. 6, the width W2 of the second suction region is longer than the width W1 of the paper P, and the second suction region in the width direction of the transport mechanism is a region wider than the paper P. For this reason, the paper P is sucked including a region on the outer side of the end portion of the paper P in the width direction. That is, since the suction region having the width W2 larger than the width W1 of the paper P is formed, the entire paper P in the width direction is sucked, and a region on the outer side of the paper P in the width direction is also further sucked. In a case where the paper P having a small size is used like the paper P having the width W2, the temperature of the atmosphere rises in some cases. By sucking the region on the outer side of the end portion of the paper P in the width direction, a rise in the temperature of the atmosphere is suppressed.

For example, in a case where the postcard-sized paper P (for example, paper having a width of 100 mm and a length of 148 mm) is used, it is assumed that the knob 60 is moved in the A1 direction and the second suction region is set. Accordingly, in a case where the paper P having a relatively small size is used, a suction force with respect to the paper P is increased, and a transport failure is prevented. In a case where paper that has a narrow width, has a length in the transport direction T shorter than a distance between the secondary transfer portion NT and the fixing portion N, and is longer than the length of the paper transport device 42 in the transport direction T, like the postcard-sized paper P, a suction force with respect to the paper P weakens, and a transport failure such as a paper jam occurs in some cases when the first suction region is formed and the paper P is sucked. In addition, in a case where an image is formed on both surfaces of the paper P, the positions of the front surface and the back surface are shifted from each other in some cases. On the contrary, as the second suction region is formed and a suction force is increased, the occurrence of a transport failure such as a paper jam is prevented, and a positional shift in a case of forming an image on both surfaces is prevented.

In addition, for example, in a case where the paper P having a width W3 in the width direction of the transport mechanism is used as shown in FIG. 8, the knob 60 is moved in the A2 direction as shown in FIG. 7. Accordingly, as shown in FIGS. 7 and 8, the shutter 52 is moved in the B2 direction. As a result, the center O, the periphery thereof, the region of the transport belt 44A on the end portion side in the width direction, and the region of the transport belt 44D on the end portion side in the width direction are defined as a region where intake is performed by the intake unit 50 (that is, the first suction region). That is, the first suction region is formed from the positions of the holes 58 formed on the outermost side of the transport belt 44A in the width direction to the positions of the holes 58 formed on the outermost side of the transport belt 44D in the width direction.

The paper P having the width W3 passes through the region of the paper transport device 42 including the center O. For example, the paper P is transported by all of the transport belts (that is, the transport belts 44A, 44B, 44C, and 44D) while being sucked via the plurality of holes 58 formed in all of the transport belts.

As shown in FIG. 8, the width W4 of the first suction region is shorter than the width W3 of the paper P, and the first suction region in the width direction of the transport mechanism is a region narrower than the paper P. For this reason, both end portions of the paper P in the width direction are not sucked by the intake unit 50. As described above, since the end portion of the paper P in the width direction is not sucked, the end portion of the paper P is prevented from being sucked and caught on the transport belts 44A and 44D, and as a result, paper wrinkles and the like are prevented from being generated.

For example, in a case where the A4 paper P (for example, paper having a width of 210 mm and a length of 297 mm) or the wider paper P (for example, paper having a width of approximately 330 mm) is used, it is assumed that the knob 60 is moved in the A2 direction and the first suction region is set. In addition, in a case where the thin paper P (for example, paper having approximately 52 gsm) is used, it is assumed that the first suction region is set. In a case where such paper P is used, a transport failure, such as twisting and fluttering of the paper P, occurs between the secondary transfer portion NT and the fixing portion N in some cases when the second suction region is formed and the paper P is sucked. On the contrary, as the first suction region wider than the second suction region is formed and the paper P is sucked, the occurrence of a transport failure, such as twisting and fluttering, is prevented. For example, if the second suction region is formed in a case where the thin paper P is used, behavior of both end portions of the paper P in the width direction is unstable, and damage to the paper P occurs or paper wrinkles are generated in some cases when the paper P is transported to the fixing portion N. As the first suction region is formed and the paper P is sucked in the region wider than the second suction region, behavior of both end portions of the paper P in the width direction becomes stable, and damage to the paper P and paper wrinkles are prevented from being generated.

Hereinafter, a positional relationship between the imaginary line V and the paper transport device 42 will be described with reference to FIGS. 9 to 12. FIGS. 9 to 12 show the secondary transfer portion NT, the fixing device 28, and the paper transport device 42.

There are various transport modes according to the length of the paper P in the transport direction T. For example, the following modes (1) and (2) are assumed. Hereinafter, the length of the paper P in the transport direction T will be referred to as "the length of the paper P".

Mode (1) In a case where the length of the paper P is larger than the distance between the secondary transfer portion NT and the fixing portion N, a portion of the paper P on a leading end side is located at the fixing portion N, and a portion of the paper P on a trailing end side is located at the secondary transfer portion NT.

Mode (2) In a case where the length of the paper P is smaller than the distance between the secondary transfer portion NT and the fixing portion N, the portion of the paper P on the leading end side is located at the fixing portion N, and the portion of the paper P on the trailing end side is not located at the secondary transfer portion NT. Alternatively, in a state where the portion of the paper P on the leading end side has not reached the fixing portion N, the portion of the paper P on the trailing end side is located at the secondary transfer portion NT in some cases. In such cases, a leading end of the paper P is not located at the fixing portion N, and a trailing end of the paper P is not located at the secondary transfer portion NT in some cases.

Figure 9:
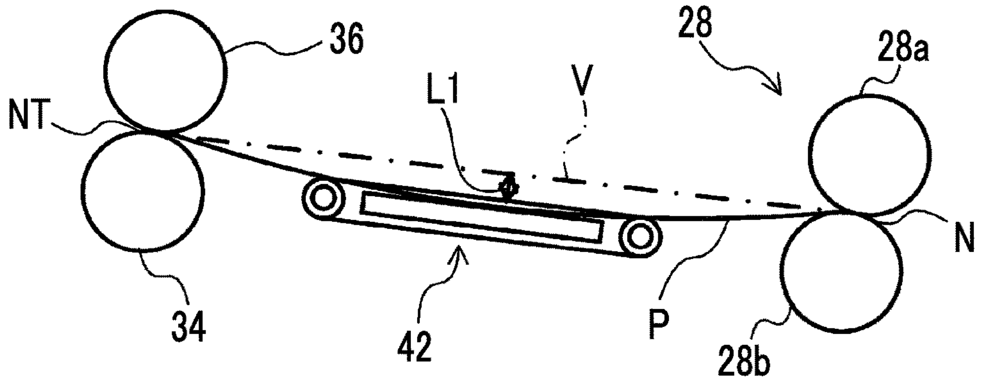
FIG. 9 is a view showing the secondary transfer portion, the fixing device, and the paper transport device.
Figure 10:
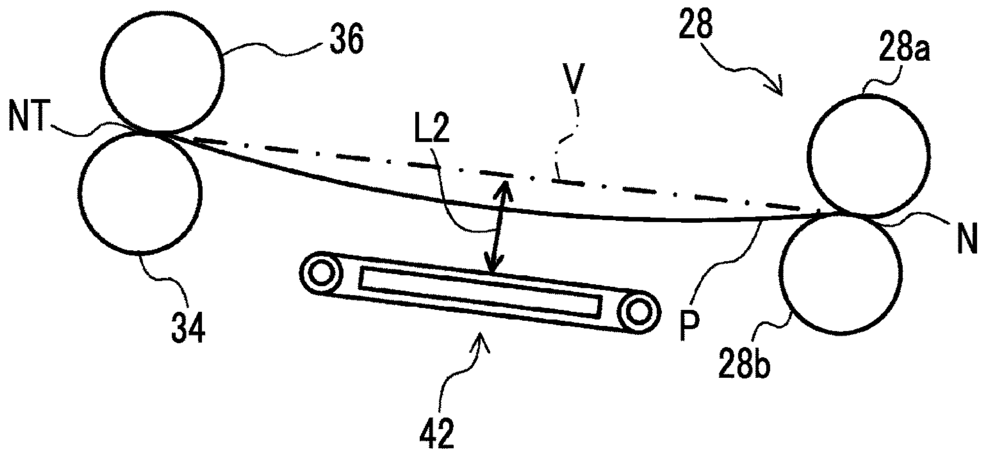
FIG. 10 is a view showing the secondary transfer portion, the fixing device, and the paper transport device.
Figure 11:
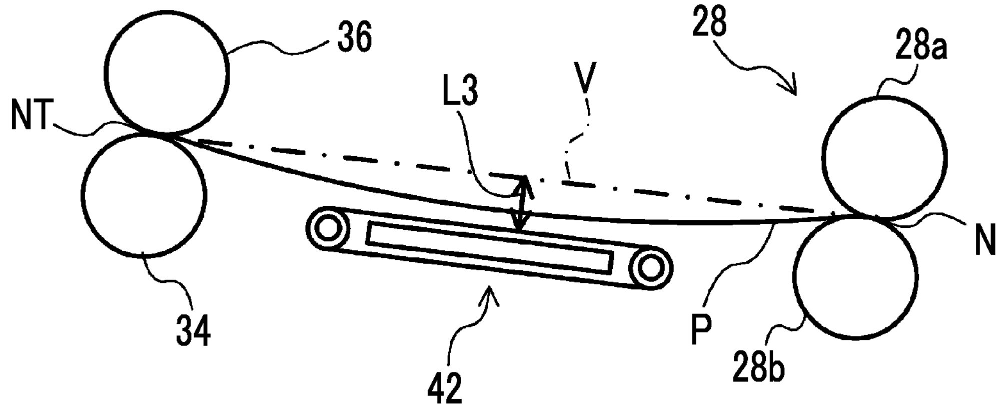
FIG. 11 is a view showing the secondary transfer portion, the fixing device, and the paper transport device.
Figure 12:
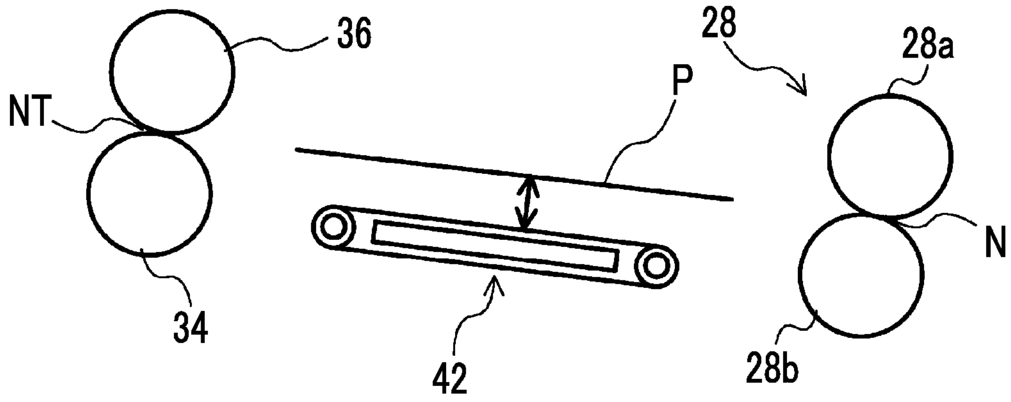
FIG. 12 is a view showing the secondary transfer portion, the fixing device, and the paper transport device.

FIGS. 9 to 11 show mode (1), and FIG. 12 shows mode (2).

For example, in a case where the size of the paper P is the A4 size (for example, paper having a width of 210 mm and a length of 297 mm), mode (1) occurs. In a case where the size of the paper P is the postcard size (for example, paper having a width of 100 mm and a length of 148 mm), mode (2) occurs.

Hereinafter, for convenience of description, the paper P having a length larger than the distance between the secondary transfer portion NT and the fixing portion N will be referred to as "the long paper P", and the paper P having a length smaller than the distance between the secondary transfer portion NT and the fixing portion N will be referred to as "the short paper P".

The paper transport device 42 is provided at a position farther from the imaginary line V than a first position is. The first position is a position where a region for bending the paper P is not secured between the imaginary line V and the paper transport device 42. In addition, the paper transport device 42 is provided at a position closer to the imaginary line V than a second position is. The second position is a position farther from the imaginary line than the first position is and is a position where a transport failure of the paper P can occur. That is, the paper transport device 42 is provided at the position farther from the imaginary line V than the first position is and the position closer to the imaginary line V than the second position is. Accordingly, the long paper P can be transported from the secondary transfer portion NT to the fixing portion N while being bent, and the short paper P can be transported from the secondary transfer portion NT to the fixing portion N while suppressing a decrease in a suction force with respect to the short paper P. Hereinafter, this point will be described in detail.

In a case where the long paper P is used, paper wrinkles are generated in some cases when the portion of the paper P on the leading end side is located at the fixing portion N and an end portion of the paper P on the trailing end side is located at the secondary transfer portion NT. For example, in a case where a speed at which the paper P is transported at the fixing portion N is slower than a speed at which the paper P is transported at the secondary transfer portion NT, paper wrinkles are generated in some case since a trailing end is transported later than the leading end of the paper P. In order to prevent the paper wrinkles, the paper P is bent between the imaginary line V and the paper transport device 42 in a space between the secondary transfer portion NT and the fixing portion N. The paper transport device 42 is provided at a position where the region for bending the paper P can be secured between the imaginary line V and the paper transport device 42. The position where the region for bending the paper can be secured is a position farther from the imaginary line V than the first position is. By providing the paper transport device 42 at the position farther from the imaginary line V than the first position is, the paper P is bent between the imaginary line V and the paper transport device 42, and paper wrinkles are prevented.

As a distance between the imaginary line V and the paper transport device 42 increases (that is, as the paper transport device 42 becomes farther from the imaginary line V), a region where the paper P is bent becomes wider, and a result, the frequency of occurrence of paper wrinkles decreases. On the other hand, as the paper transport device 42 becomes farther from the imaginary line V, intake by the intake unit 50 with respect to the position of the imaginary line V weakens, and as a result, a suction force with respect to the paper P weakens. In a case where the paper transport device 42 is provided at the position farther from the imaginary line V than the second position is, a failure in transport with suction occurs. That is, a suction force sufficient for allowing transport by suction becomes unable to be obtained, and as a result, a transport failure occurs. For example, in a case where the short paper P is used, the paper P stands between the secondary transfer portion NT and the fixing portion N, and a transport failure such as a paper jam occurs in some cases. In order to prevent the transport failure, the paper transport device 42 is provided at the position closer to the imaginary line V than the second position is.

In the example shown in FIG. 9, the paper transport device 42 is arranged at a position where a linear distance between the imaginary line V and the paper transport device 42 is a distance L1. The position of the distance L1 corresponds to the first position. In a case where the paper transport device 42 is provided at the position, the region where the paper P is bent is not secured between the imaginary line V and the paper transport device 42 as shown in FIG. 9.

In the example shown in FIG. 10, the paper transport device 42 is provided at a position where the linear distance between the imaginary line V and the paper transport device 42 is a distance L2. The distance L2 is a distance longer than the distance L1, and the position of the distance L2 corresponds to the second position. In a case where the paper transport device 42 is provided at the position, the region where the paper P is bent is secured between the imaginary line V and the paper transport device 42 as shown in FIG. 10. However, in a case where the short paper P is used, a suction force with respect to the paper P decreases, and as a result, a transport failure occurs in some cases.

In the example shown in FIG. 11, the paper transport device 42 is provided at a position where the linear distance between the imaginary line V and the paper transport device 42 is a distance L3. The distance L3 is a distance between the distance L1 and the distance L2, and the position of the distance L3 is a position farther from the imaginary line V than the first position is and is a position closer to the imaginary line V than the second position is. By providing the paper transport device 42 at a third position, the long paper P is transported between the imaginary line V and the paper transport device 42 while being bent in the space between the secondary transfer portion NT and the fixing portion N, and a decrease in a suction force with respect to the short paper P is suppressed. Accordingly, the occurrence of paper wrinkles of the long paper P is prevented, and the occurrence of a transport failure of the short paper P is prevented.

Figures 13, 14:
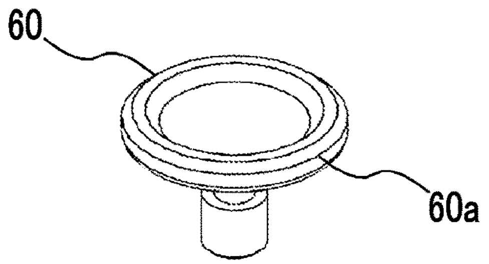
FIG. 13 is a view showing a result of transport according to a distance between an imaginary line and the paper transport device.
FIG. 14 is a perspective view showing a knob.

FIG. 13 shows a result of transport according to a distance L between the imaginary line V and the paper transport device 42.

In a case where the distance L is 4 mm or less, the region where the long paper P is bent is not secured between the imaginary line V and the paper transport device 42 (a bending region "×" in FIG. 13), and a transport failure (for example, paper wrinkles) occurs (runnability "×" in FIG. 13) in the long paper P (for example, A4 paper).

In a case where the distance L is longer than 4 mm and is equal to or less than 8 mm (in a case of 4 to 8 mm), the region where the long paper P is bent is sufficient (the bending region "Δ" in FIG. 13), and a transport failure such as a paper wrinkle occurs in the long paper P in some cases (the runnability "Δ" in FIG. 13). In a case where the short paper P (for example, the postcard-sized paper) is used, a suction force by the intake unit 50 is increased (for example, the suction force is increased by approximately 20 to 50%), and the area of the suction region in the paper transport device 42 is decreased (for example, the area of 70 to 90%).

In a case where the distance L is longer than 8 mm and is equal to or less than 14 mm (in a case of 8 to 14 mm), the region where the long paper P is bent is secured (the bending region "○" in FIG. 13), and the occurrence of a paper wrinkle is prevented (the runnability "○" in FIG. 13).

In a case where the distance L is 14 mm or more, the region where the long paper P is bent is secured (the bending region "○" in FIG. 13), but a suction force for transporting the short paper P while sucking is not obtained, and a transport failure occurs in the short paper P (the runnability "×" in FIG. 13).

In the example shown in FIG. 13, a distance of 4 to 8 mm corresponds to an example of the distance L3. That is, by arranging the paper transport device 42 at a position in a range where the distance L from the imaginary line V is 4 to 8 mm, a transport failure does not occur in both of the long paper P and the short paper P, and the paper P is transported.

Numerical values shown in FIG. 13 are merely examples, the distance between the secondary transfer portion NT and the fixing portion N can change according to the size of the inside of the image forming apparatus 10, the magnitude of a suction force by the intake unit 50, and the size of the paper transport device 42. For example, the distance L3 is assumed to be obtained through experiments or simulations for each image forming apparatus 10 or for each type of device.

Hereinafter, the shape of the knob 60 will be described with reference to FIG. 14. FIG. 14 is a perspective view of the knob 60. The knob 60 has a disk shape. In a side surface of the knob 60, a recess 60*a* is formed in a circumferential direction along the side surface. For example, the operator, such as a user, is assumed to operate the knob 60 by hooking the finger to the recess 60*a*.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A paper transport device comprising:

a transport mechanism that transports paper to which an image is transferred to a fixing device while sucking the paper, wherein the transport mechanism comprises a transport belt; and a switching mechanism that switches between suction regions in a width direction of the transport mechanism, which corresponds to a width direction of the paper, according to a size of the paper, wherein the switching mechanism is a shutter having an open space, and the transport mechanism is configured to suck the paper via the open space, wherein the switching mechanism is configured to move in the width direction of the transport mechanism, and the suction regions have different widths, wherein an imaginary line connects a position where the image is transferred to the paper and a position where the image is fixed to the paper by the fixing device to each other, and the transport mechanism is provided at a position farther from the imaginary line than a first position is, wherein the first position is a position at which paper wrinkles occur in a case where a speed at which the paper is transported at the position where the image is fixed to the paper is slower than a speed at which the paper is transported at the position where the image is transferred to the paper.

2. The paper transport device according to claim 1, wherein the transport mechanism is provided at a position closer to the imaginary line than a second position that is farther from the imaginary line than the first position is, wherein the second position is a position at which a transport failure of the paper occurs.

3. The paper transport device according to claim 2, wherein the switching mechanism switches, according to the size of the paper, between a first suction region in the width direction of the transport mechanism and a second suction region different from the first suction region, an end portion of the paper in the width direction is not sucked by the transport mechanism in the first suction region in a case where a width of the paper is larger than a width of the first suction region, and a region on an outer side of the end portion of the paper in the width direction is sucked in the second suction region in a case where the width of the paper is smaller than a width of the second suction region.

4. The paper transport device according to claim 3, further comprising:

a knob that is provided on an end portion side with respect to a center of the transport mechanism and is used for operating the switching mechanism to switch between the suction regions in the width direction of the transport mechanism.

5. The paper transport device according to claim 2, further comprising:

a knob that is provided on an end portion side with respect to a center of the transport mechanism and is used for operating the switching mechanism to switch between the suction regions in the width direction of the transport mechanism.

6. The paper transport device according to claim 1, wherein the switching mechanism switches, according to the size of the paper, between a first suction region in the width direction of the transport mechanism and a second suction region different from the first suction region, an end portion of the paper in the width direction is not sucked by the transport mechanism in the first suction region in a case where a width of the paper is larger than a width of the first suction region, and a region on an outer side of the end portion of the paper in the width direction is sucked in the second suction region in a case where the width of the paper is smaller than a width of the second suction region.

7. The paper transport device according to claim 6, further comprising:

a knob that is provided on an end portion side with respect to a center of the transport mechanism and is used for operating the switching mechanism to switch between the suction regions in the width direction of the transport mechanism.

8. The paper transport device according to claim 1, further comprising:

a knob that is provided on an end portion side with respect to a center of the transport mechanism and is used for operating the switching mechanism to switch between the suction regions in the width direction of the transport mechanism.

9. The paper transport device according to claim 1, wherein the switching mechanism switches, according to the size of the paper, between a first suction region in the width direction of the transport mechanism and a second suction region different from the first suction region, an end portion of the paper in the width direction is not sucked by the transport mechanism in the first suction region in a case where a width of the paper is larger than a width of the first suction region, and a region on an outer side of the end portion of the paper in the width direction is sucked in the second suction region in a case where the width of the paper is smaller than a width of the second suction region.

10. The paper transport device according to claim 9, further comprising:

a knob that is provided on an end portion side with respect to a center of the transport mechanism and is used for operating the switching mechanism to switch between the suction regions in the width direction of the transport mechanism.

11. The paper transport device according to claim 1, further comprising:

a knob that is provided on an end portion side with respect to a center of the transport mechanism and is used for operating the switching mechanism to switch between the suction regions in the width direction of the transport mechanism.

* * * * *